Nov. 20, 1923.
E. MULLER
1,474,543
VEHICLE WASHER
Filed Sept. 27, 1919
2 Sheets—Sheet 1
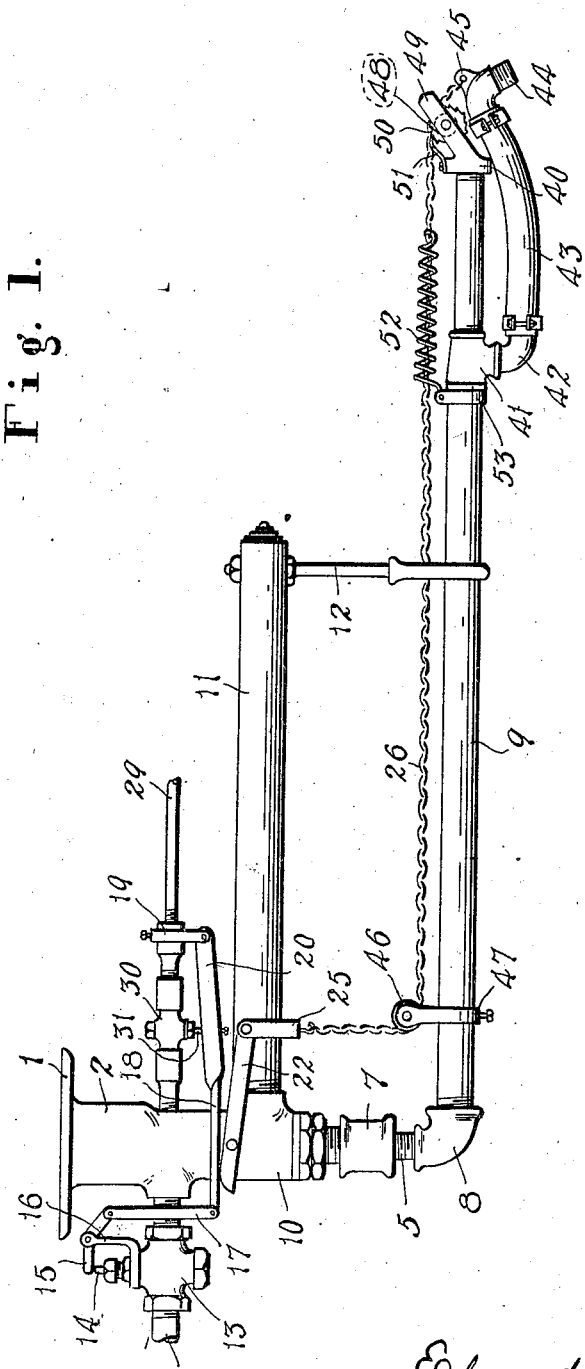
INVENTOR:
Edward Muller,
BY
Russell M. Everett,
ATTORNEY.

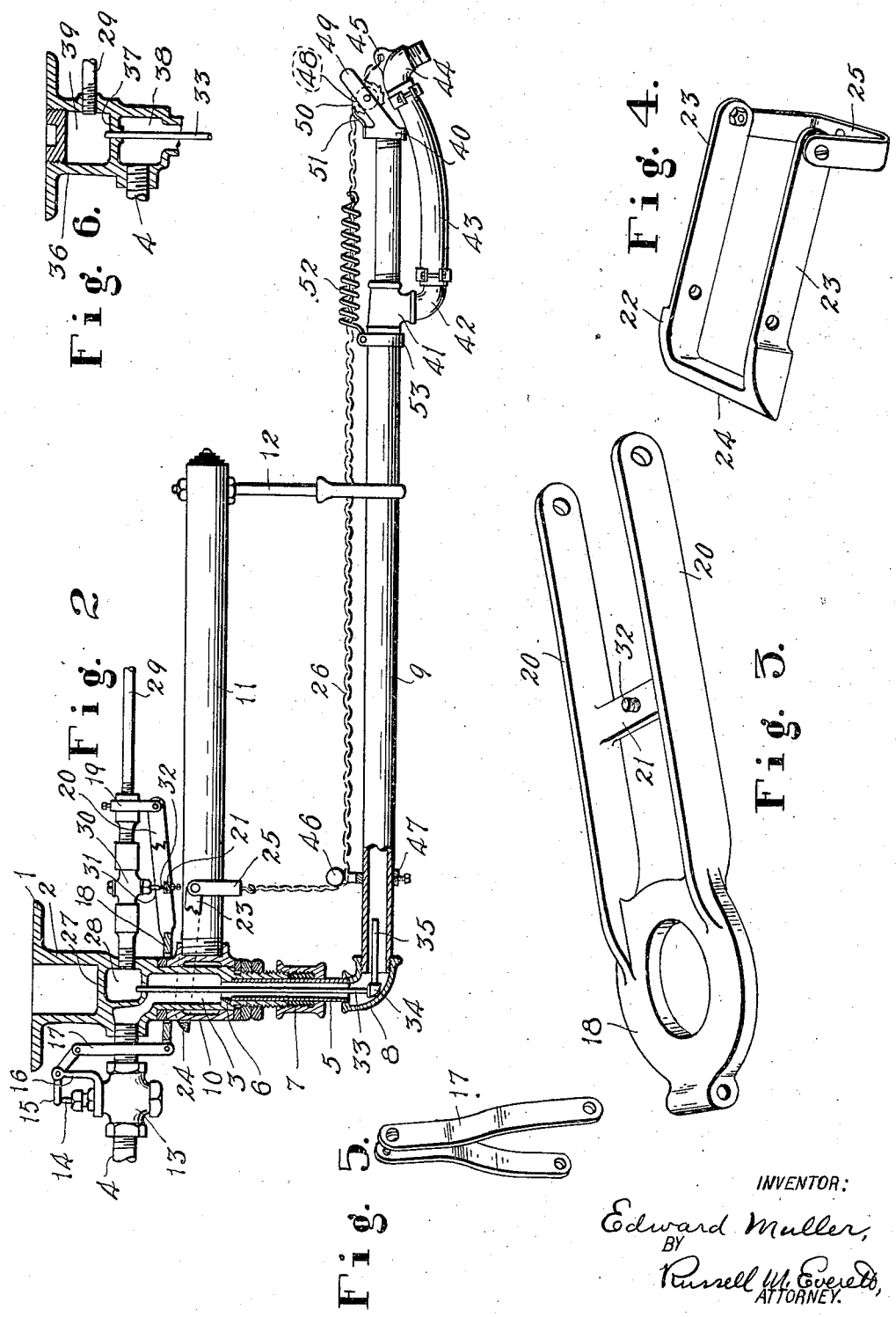

Patented Nov. 20, 1923.

1,474,543

UNITED STATES PATENT OFFICE.

EDWARD MULLER, OF NORTH BERGEN, NEW JERSEY.

VEHICLE WASHER.

Application filed September 27, 1919. Serial No. 326,802.

*To all whom it may concern:*

Be it known that I, EDWARD MULLER, a citizen of the United States, and a resident of North Bergen, in the county of Hudson and State of New Jersey, have invented new and useful Improvements in Vehicle Washers, of which the following is a specification.

This invention relates to that class of vehicle washers known as overhead washers, and more particularly to means for operating and controlling the supply of water, or a supply of water and air, to such a washer.

The objects of the invention are to secure improved means for turning on the water in an overhead washer, which will operate regardless of the swinging or rotating movements of the washer; to secure water control means which will also control a supply of air under pressure to give the stream of water more force; to enable the operator to obtain only water from the discharge hose, or water with the added impetus of the compressed air, as desired; to control both water and air by pulling down upon the discharge hose, the water being first turned on and the air turned on subsequently when the hose is pulled down further; to permit the washer arm to be rotated without affecting the water and air supply, and to obtain other advantages and results as may be brought out in the following description.

Referring to the accompanying drawings, in which the numerals of reference indicate the same parts throughout the several views:

Figure 1 is a side elevation, of a vehicle washer constructed in accordance with my invention;

Figure 2 is a vertical sectional view through the same, portions being shown in side elevation;

Figure 3 is a detail perspective view of a valve operating ring;

Figure 4 is a perspective view of the cam lever for lifting said ring;

Figure 5 is a perspective view of the link connecting the valve operating lever and the said ring, and Figure 6 is a vertical sectional view of a modified construction of washer support.

Specifically describing the present embodiment of the invention the numeral 1 designates a supporting flange adapted to be secured to a ceiling or other overhead support, and from this flange depends the body portion of the support 2 which provides an interior flow passage 3 for water introduced through a lateral inlet or fixed water supply pipe 4. Said inlet is at the upper part of the flow passage 3, and at the lower end of said flow passage is inserted a tube 5 engaging at its upper end a shoulder 6 in said passage for limiting upward movement of said tube. The body portion of the support 3 is exteriorly screw threaded at its lower end, and receives a stuffing box 7 thereon by means of which a water tight joint may be obtained between the support and said tube, and permit the tube to rotate. This tube 5 is shown threaded at at its lower end into an elbow 8 into the other end of which is screwed a rotatable washer pipe arm 9.

In order to afford a support for the arm 9 and relieve the stuffing box from the strain, a collar 10 is rotatably mounted upon the exterior of the support 2 above said threaded lower end and below the water inlet 4. A lateral extension, shown as a piece of pipe 11 rigid with respect to and projecting radially from said collar, extends above the washer arm 9 preferably parallel thereto and is provided with a hanger 12 which receives said arm, thereby supporting it. Obviously as the arm is revolved or swung around by the operator, the extension 11 is swung with it, always being above it to afford its support.

A valve 13 is contained in the water inlet pipe 4, preferably near the support 2, said valve having a stem 14 normally held outward with the water shut off and adapted to be depressed for turning on the water. This stem is arranged to be depressed by a lever 15 one end of which overlies the stem and the other end of which is shown extending toward the support, said lever being fulcrumed between its ends upon a suitable bracket 16. A bifurcated link 17, see Figure 5, depends from the end of the lever next the support, the sections of said link passing upon opposite sides of the inlet 4. Below the inlet pipe 4 and surrounding the support 2 above the extension 11 is a ring 18 adapted to move up and down and pivotally attached at one side to the link 17 for moving it up and down also. Preferably to mount the ring so as to afford this up and down movement, it is pivoted to a fixed bracket 19 at a distance from the support 2 upon the opposite side thereof from the link 17, and as shown in Figure 3 this is done by arms 20, 20 integral with the ring extending substantially parallel and connected intermediate of their ends by a cross piece 21 for purposes hereinafter described.

Below the ring 18 and pivoted to the collar 10 which carries the extension 11, see Figure 1, so as to revolve with the pipe arm 9, is a cam lever 22 providing parallel portions 23, 23 upon opposite sides of the support, see Figure 4, said portions being pivoted directly opposite each other and being connected preferably at the same ends by a cross member or cam 24. At their other ends a yoke 25 is attached and to that in turn is secured a chain 26. Obviously by pulling down upon the chain 26, the cam 24 is swung upward against the ring 18, which is thereupon swung upward, transmitting the movement by means of link 17 and lever 15 to the stem 14 and depressing the same to turn on the water.

A suitable partition 27 is provided adjacent the top of the flow passage 3, see Figure 2, which segregates a chamber 28 from said flow passage, and into this chamber is introduced air pressure from an air inlet pipe 29. The supply of air pressure to said chamber is controlled by a valve 30 having a stem 31 adapted to be pressed inward for turning on the air. This stem I have shown pointing downward and adapted to be engaged by a set screw 32 extending upwardly through the cross piece 21 of the ring arms 20, 20. Upward movement of the ring causes said set screw to engage the valve stem and permit a flow of air into said chamber 28. Within the flow passage 3, preferably extending up through the middle of the same, is a jet pipe 33 which passes at its upper end through the lower wall of the air chamber and at its lower end is turned by means of an elbow 34 laterally as at 35 within the pipe arm 9. Obviously the air pressure contained in the air chamber will pass through said jet pipe and be emitted in a jet from the end thereof within the pipe arm in the same direction as the flow of water, which is thereby ejected with greater velocity. Preferably this jet pipe is rotatably inserted through the wall of the air chamber so it will turn readily when the pipe arm is swung around.

In Figure 2, I have shown the water supply and the air supply pipes entering the support 2 exactly opposite to each other, or in the same horizontal plane. In Figure 6, this is modified to the extent that the air pipe 29 enters a support 36 at a level above the water inlet pipe 4 and a single partition 37 extends diametrically across the interior passage 38 of the support between the said inlet pipes. In this instance, the upper end of the support is also closed and an air chamber 39 is thus formed between the top closure and said partition. In this case, the jet pipe 33 projects through the lower partition wall 37, in which it is rotatable so that its lower end will turn with the pipe arm 9. Obviously in both cases, the air is employed to increase the velocity of the water from the discharge hose.

The discharge end of said pipe arm 9 is closed by means of a cap 40 and provided at a suitable intermediate point with a T 41 adapted to receive a downwardly directed elbow 42 which turns toward the cap 40 at the outer end of the arm. To this elbow is clamped one end of a flexible tube 43 the other end of which carries an elbow 44 which turns downward substantially beneath the cap 40 and is adapted to receive a discharge hose (not shown) for washing the vehicle. Preferably the chain 26 previously described as connected at one end to the yoke 25, is connected at its other end to the elbow 44, for which purpose said elbow has an ear 45, so that the valves may be opened either by the weight of the hose or a downward pull thereon by the operator. In order to do this, the chain 26 passes under an idle pulley 46 suitably secured to the pipe arm 9, as by a housing 47 below the yoke. The chain passes over a sheave 48 mounted between arms 49, 49 of the cap 40, said sheave providing a smooth circumferential bearing surface around which the chain is wound one or more times and having at one end a ratchet wheel 50 the teeth of which project rearwardly and are engaged by a spring pawl 51 fixed to the cap, as shown more fully in my prior Patent No. 1,022,042 of April 12, 1912 to which reference may be had if desired. The chain 26 is shown passing through a spiral spring 52, one end of the spring being fixed to a collar 53 on the pipe arm and the other end being hooked into a link of the chain, so that the chain will ordinarily be drawn taut around the sheave by the spring on one side and by the weight of the discharge hose on the other side.

It will be understood that in operation the workman merely pulls downward upon the discharge hose (not shown), which is connected to the elbow 44, which rotates the sheave 48 and draws upon the chain 26 to open the valves and permit a flow of water and air. Since the sheave cannot turn backward because of the spring pawl 51 and the tension of the chain prevents it from slipping upon the sheave, the flow of water will continue until the hose is slackened or raised, when the chain will slip on the sheave and the valves close. Preferably the valves are so arranged and adjusted that the water valve is first opened as the opertor pulls down upon the discharge hose, so that he is able to obtain just a flow of water. But upon drawing down further upon the discharge hose the ring 18 is raised further and thereupon opens the air valve 30, whereupon the water will be ejected with increased velocity by the air pressure.

It will be noted that by the construction described the cam lever 22, whose arms 23, 23 engage the ring of the valve actuating lever, can be made very short and compact, and fulcrumed upon the collar 10, so that its range of movement is small and there is no appreciable lost motion. The said arms 23, 23 by reason of the shortness of their engaging ends engage the valve-actuating lever at points which are not far distant from each other lengthwise of said lever, when the rotary discharge pipe is swung into various positions. This secures a more uniform action of the valve-controlling means and a more nearly uniform exertion upon the part of the operator to effect such operation. Furthermore, the lever 22 can be provided at the ends of its arms 23 with cams to engage the ring 18 of the valve-actuating lever and secure a more easy action, as well as permitting the cam lever to occupy an inclined position without detriment.

Obviously detail modifications and changes may be made in the manufacture of my improved vehicle washer, without departing from the spirit and scope of the invention, and I do not wish to be understood as restricting myself except as required by the following claims when construed in the light of the prior art.

Having thus described the invention what I claim is:

1. In a device of the character described, the combination with a stationary fluid supply valve, a rotary pipe arm, and a discharge tube movable with respect to said pipe arm, of a non-rotary valve-actuating lever having a circular portion concentric with the center of movement of the said pipe arm, a rotary operating lever always engaging said circular portion of the valve-actuating lever, and means connecting said operating lever to said movable discharge tube.

2. In a device of the character described, the combination with a stationary fluid supply valve, a rotary pipe arm, and a discharge tube movable with respect to said pipe arm, of a non-rotary valve-actuating lever having a circular portion concentric with the center of movement of said pipe arm, a rotary operating lever having a cam portion always engaging said circular portion of the valve-operating lever, and means connecting said operating lever to said movable discharge tube.

3. In a device of the character described, the combination with a stationary fluid supply valve, a rotary pipe arm, and a discharge tube movable with respect to said pipe arm, of a non-rotary valve-actuating lever having a ring portion concentric with the center of movement of said pipe arm, a rotary operating lever having opposite spaced arms and a cam portion connecting the same and always engaging said ring portion of the valve-operating lever, and means connecting said operating lever to said movable discharge tube.

4. In a device of the character described, the combination with a stationary tubular support, a fluid supply valve on one side of said support, a pipe arm having rotary movement around a center in the axial line of said support, and a discharge tube movable with respect to said pipe arm, of a non-rotary valve-actuating lever having a ring portion around said support, a rotary operating lever always engaging said ring portion, and means connecting said operating lever to said movable discharge tube.

5. In a device of the character described, the combination with a stationary tubular support, a fluid supply valve on one side of said support, a pipe arm having rotary movement around a center in the axial line of said support, and a discharge tube movable with respect to said pipe arm, of a non-rotary valve-actuating lever having a ring portion around said support, a rotary operating lever having spaced arms on the opposite sides of said support and a cam portion connecting said arms and always engaging said ring portion of the valve operating lever, and means connecting said operating lever to said movable discharge tube.

6. In a device of the character described, the combination of a plurality of fluid supply valves, a rotary discharge pipe common to said supply valves, a non-rotary lever for opening both said valves, a rotary operating lever for said valve lever, and means connecting said operating lever to said discharge pipe.

7. In a device of the character described, the combination of two fluid supply valves, a common movable discharge pipe, an actuating lever engaging one of said valves to open and close the same, connecting means between said lever and the other of said valves for opening and closing the same, cam means for operating said lever, and connecting means between said cam means and the said movable discharge pipe to open and close both said valves by movement of the discharge pipe.

8. In a device of the character described, the combination of a stationary tubular support, fluid supply valves on opposite sides of said support, a non-rotating valve-actuating lever for opening said valves, a rotary discharge pipe common to said valves, and means for actuating said lever from said rotary discharge pipe.

9. In a device of the character described, the combination of a stationary tubular support, fluid supply valves on opposite sides of said support, a non-rotating valve-actuating lever for opening said valves adjustable with respect to one of them, a rotary discharge pipe common to said valves, and means for actuating said lever from said rotary discharge pipe.

10. In a device of the character described, the combination of a stationary tubular support, fluid supply valves on opposite sides of said support, a non-rotating valve-actuating lever for opening said valves connected to one of them and having an adjustable contact to engage the other, a rotary discharge pipe common to said valves, and means for actuating said lever from said rotary discharge pipe.

EDWARD MULLER.